United States Patent [19]

Shinozaki

[11] Patent Number: 5,308,891

[45] Date of Patent: May 3, 1994

[54] CEMENT BASED HEAT INSULATOR, METHOD OF MAKING SAME AND STRUCTURE HAVING SAME

[75] Inventor: Yukuo Shinozaki, Kashiwa, Japan

[73] Assignee: Takenaka Corporation, Osaka, Japan

[21] Appl. No.: 117,876

[22] Filed: Sep. 7, 1993

Related U.S. Application Data

[63] Continuation of Ser. No. 778,226, Dec. 11, 1991, abandoned.

[30] Foreign Application Priority Data

Apr. 25, 1990 [JP] Japan ................. 2-109546
Apr. 25, 1990 [JP] Japan ................. 2-109547

[51] Int. Cl.$^5$ ................................. C08J 9/32
[52] U.S. Cl. ........................ 523/218; 524/5; 524/495
[58] Field of Search ............ 523/218; 524/5, 495

[56] References Cited

U.S. PATENT DOCUMENTS

| | | | |
|---|---|---|---|
| 4,902,347 | 2/1990 | Soroushian et al. | 106/99 |
| 4,915,739 | 4/1990 | Sawanobori et al. | 106/99 |
| 5,030,282 | 7/1991 | Matsuhashi et al. | 106/692 |
| 5,075,358 | 12/1991 | Riley et al. | 524/5 |

Primary Examiner—Paul R. Michl
Assistant Examiner—U. K. Rajguru
Attorney, Agent, or Firm—Kalish & Gilster

[57] ABSTRACT

This invention relates to a heat insulator and a structure using the heat insulator and aims to provide a heat insulator which can be subject to a dry application using the heat insulator in the molded board or a wet application, having characteristics similar to those of a conventional inorganic heat insulator and a high strength which has not been provided before and to provide a structure using the above heat insulator. The heat insulator of this invention is prepared by mixing 3 to 50 parts by weight of synthetic resin emulsion in solid content equivalency, 1 to 20 parts by weight of organic microballoon, 0.3 to 5 parts by weight of carbon fiber and 10 to 200 parts by weight of inorganic microballoon with 100 parts by weight of cement. And the heat insulator of this invention is prepared by mixing 3 to 50 parts by weight of synthetic resin emulsion in solid content equivalency, 1 to 20 parts by weight of organic microballoon and 0.3 to 5 parts by weight of carbon fiber with 100 parts by weight of cement.

6 Claims, 4 Drawing Sheets

CEMENT BASED HEAT INSULATOR, METHOD OF MAKING SAME AND STRUCTURE HAVING SAME

This application is a continuation of application Ser. No. 07/778,226, filed Dec. 11, 1991, now abandoned.

BACKGROUND OF THE INVENTION

1. Field of the Invention

This invention relates to a heat insulator and a structure using the heat insulator.

2. Prior Art

A heat insulator for buildings which heretofore has been known includes a heat insulator molded board such as Styrofoam (a registered trademark) to be integrally applied by being driven in the form to serve for a fill-up concrete block, too and an expanded urethane to be applied by being sprayed onto a concrete surface on a job site.

An organic heat insulator such as the above expanded urethane and Styrofoam to be applied on a job site has a very low thermal conductivity of 0.02 to 0.03 (kcal/mhr°C.), exhibiting a remarkable heat-insulating property. But it has a disadvantage that it is easily flammable because it is organic.

In view of legal fire preventing regulations and to provide strength, a flame retardant material such as a plaster board is put on the organic heat insulator to form a base on which facing is required to be applied. This requires many construction steps to make a building fireproofed, resulting in a disadvantage requiring much labor.

As a heat insulator free from the above disadvantage, an expanded mortar, pearlite mortar and other lightweight mortar are used as an inorganic heat insulator.

Such an inorganic heat insulator is hard to burn. But it has a thermal conductivity of 0.2 to 0.3 (kcal/mhr°C.) which is very large as compared with that (0.02 to 0.03 kcal/mhr°C.) of an organic heat insulator. Therefore, it has a disadvantage that its heat-insulating performance is inferior to that of the organic heat insulator.

Thus, it is difficult to obtain a desired heat-insulating performance. And to obtain the desired performance, a very thick insulator is required Heretofore, as the inorganic heat insulator for a building, there has been used a heat-insulating material such as an expanded mortar and pearlite mortar in which cement is mainly used in the form of matrix.

Such an expanded mortar and pearlite mortar are applied by a wet process such as spraying and troweling or a dry process in the form of a heat insulator molded board.

The above expanded mortar, pearlite mortar and other heat insulators are inorganic and are hard to burn because they use cement in the form of matrix. And they have properties which are expected to provide strength to some extent. But their thermal conductivity is 0.2 to 0.3 (kcal/mhr°C.) which are very large as compared with 0.02 to 0.03 (kcal/mhr°C.) of Styrofoam, expanded urethane and other organic heat insulators, being inferior in a heat-insulating performance.

Therefore, it is difficult to obtain a desired heat-insulating performance. To obtain the desired performance, it is required to use a very thick insulator.

On the other hand, the organic heat insulators such as an expanded urethane and Styrofoam which are applied on a job site have a thermal conductivity of 0.02 to 0.03 (kcal/mhr°C.) which is very small, exhibiting a remarkable heat-insulating performance. But they have a disadvantage that they are easily flammable because they are organic.

In view of legal fire preventing regulations and strength, a flame retardant material such as a plaster board is put on the organic heat insulator to form a base on which facing is required to be applied. This requires many construction steps to make a building fireproofed, resulting in a disadvantage requiring much labor.

SUMMARY OF THE INVENTION

This invention has been completed to remedy the above problems. It aims to provide a heat insulator and a structure using the above heat insulator. This heat insulator can be applied by a dry process in which it is used in the form of a molded board or a wet process, has a heat-insulating performance which is similar to that of an organic heat insulator, fire retardance which is identical to that of a conventional inorganic heat insulator, and a higher strength than a conventional heat insulator.

The first version of the new heat insulator consists of 100 parts by weight of cement, 3 to 50 parts by weight of synthetic resin emulsion in solid content equivalency, 1 to 20 parts by weight of organic microballoon, 0.3 to 5 parts by weight of carbon fiber and 10 to 200 parts by weight of inorganic microballoon.

Reasons for adding 3 to 50 parts by weight of synthetic resin emulsion in solid content equivalency to 100 parts by weight of cement are that adding less than 3 parts by weight deteriorates a bond performance and adding more than 50 parts by weight deteriorates a fire resistant performance, adversely increasing costs.

Reasons for adding 1 to 20 parts by weight of organic microballoon to 100 parts by weight of cement are that adding less than 1 part by weight deteriorates a heat-insulating performance and adding more than 20 parts by weight deteriorates a fire resistant performance and strength, adversely increasing costs.

Reasons for adding 0.3 to 5 parts by weight of carbon fiber to 100 parts by weight of cement are that adding less than 0.3 part by weight lowers a matrix reinforcing effect and an effect of preventing cracks due to contraction and adding more than 5 parts by weight results in bulky fiber inducing poor workablity, while increasing cost but not increasing a reinforcing effect so much.

Reasons for adding 10 to 200 parts by weight of inorganic microballoon to 100 parts by weight of cement are that adding less than 10 parts by weight increases amounts of other expensive materials increasing costs and not useful in enhancing fire resistant performance and adding more than 200 parts by weight results in a brittle product. In view of improved fire resistant performance, strength and costs, the inorganic microballoon is desirably added in 10 to 100 parts by weight to 100 parts by weight of cement.

A first embodiment of a heat insulator is prepared by mixing and kneading cement and inorganic microballoon with for example synthetic resin emulsion, carbon fiber, organic microballoon, and if necessary a mixture in the form of paste prepared by mixing and kneading water-soluble resin, antifoamer, and mildewproofing agent in advance.

The structure is formed by forming a heat-insulating layer on a structure body by a wet process in which a heat insulator prepared by mixing 3 to 50 parts by weight of synthetic resin emulsion in solid content equivalency, 1 to 20 parts by weight of organic microballoon, 0.3 to 5 parts by weight of carbon fiber and 10 to 200 parts by weight of inorganic microballoon with 100 parts by weight of cement is applied.

The wet process means to form a heat-insulating layer by adhering a viscous fluid heat insulator onto the surface of a structure body by spraying or troweling.

A first embodiment of a structure using the new heat insulator has a seamless heat-insulating layer formed on the structure body by applying the new heat insulator by the wet process. Therefore, heat conduction through the structure is effectively prevented and fire retardance is improved.

Formation of the heat-insulating layer by the wet process is effected by adhering a viscous fluidity or a heat insulator onto the surface of concrete to a certain thickness on a job site by spraying or troweling.

In the structure having the above heat-insulating layer formed, the heat-insulating layer has a small moisture permeation coefficient but an appropriate water absorption. When a room humidity increases, the heat-insulating layer absorbs moisture to collect therein, and when the room humidity lowers, the heat-insulating layer releases moisture, thereby automatically adjusting the room humidity The new heat insulator can also be prepared as in a second embodiment by mixing 3 to 50 parts by weight of synthetic resin emulsion in solid content equivalency, 1 to 20 parts by weight of organic microballoon and 0.3 to 5 parts by weight of carbon fiber to 100 parts by weight of cement.

Reasons for adding 3 to 50 parts by weight of synthetic resin emulsion in sold content equivalency to 100 parts by weight of cement are that adding less than 3 parts by weight deteriorates a bond performance and adding more than 50 parts by weight deteriorates a fire resistant performance, adversely increasing costs.

Reasons for adding 1 to 20 parts by weight of organic microballoon to 100 parts by weight of cement are that adding less than 1 part by weight deteriorates a heat-insulating performance and adding more than 20 parts by weight lowers a fire resistant performance and strength, adversely increasing costs.

And reasons for adding 0.3 to 5 parts by weight of carbon fiber to 100 parts by weight of cement are that adding less than 0.3 part by weight lowers a matrix reinforcing effect and an effect of preventing cracks due to contraction and adding more than 5 parts by weight results in bulky fiber inducing poor workability, while increasing costs but not increasing a reinforcing effect so much.

The second version of the new heat insulator just described is prepared by mixing and kneading cement with for example synthetic resin emulsion, carbon fiber, organic microballoon and if necessary a mixture in the form of paste which is prepared by mixing and kneading water-soluble resin, antifoamer, and mildewproofing agent in advance.

The new structure can also be formed by forming a heat-insulating layer on a structure body by a wet process in which a heat insulator prepared by mixing 3 to 50 parts by weight of synthetic resin emulsion in solid content equivalency, 1 to 20 parts by weight of organic microballoon and 0.3 to 5 parts by weight of carbon fiber with 100 parts by weight of cement is applied.

The wet process means to form a heat-insulating layer by adhering a viscous fluid heat insulator onto the surface of a structure body by spraying or troweling.

The new structure just described has its heat conduction through it effectively prevented and fire retardance improved because a seamless heat-insulating layer is formed by applying the second version of the new heat insulator by the wet process.

Formation of the heat-insulating layer by the wet process is effected by adhering a viscous fluid heat insulator onto the surface of concrete to a certain thickness on a job site by spraying or troweling.

In the structure having the above heat-insulating layer formed, the heat-insulating layer has a small moisture permeation coefficient but an appropriate water absorption. When a room humidity increases, the heat-insulating layer absorbs moisture to collect therein, and when the room humidity lowers, the heat-insulating layer releases moisture, thereby automatically adjusting the room humidity.

DESCRIPTION OF THE PREFERRED EMBODIMENTS

The present invention will be described in detail with reference to the embodiments of the drawings.

Figure 1:
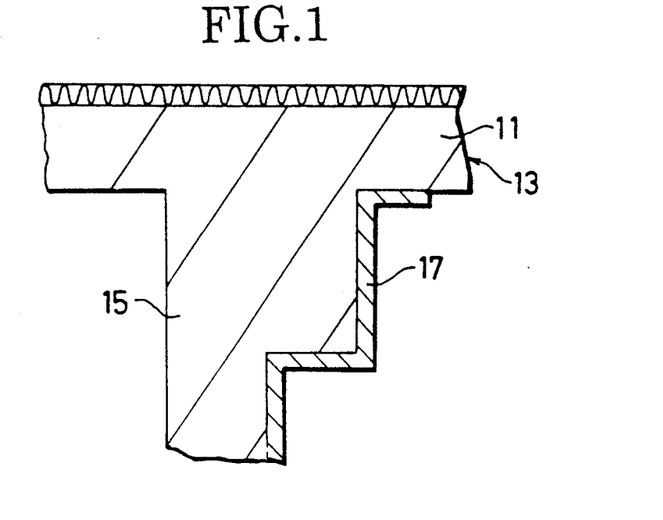
FIG. 1 is a vertical section showing one embodiment of the structure using the heat insulator of this invention.

FIG. 1 shows one embodiment of the structure of this invention, in which reference numeral 11 shows a roof slab of a structure body 13.

This roof slab 11 is supported by a beam 15 of the structure body 13.

The inner face of the beam 15 and the lower face of the roof slab 11 have a heat-insulating layer 17 formed. The heat-insulating layer 17 formed on the lower face of the roof slab 11 has a thickness of about 50 to 60 cm for example from the inner side of the beam 15. This is to prevent the formation of heat bridge or to prevent conduction of heat from outside through a roof.

The heat-insulating layer 17 is formed by adhering a viscous fluid heat insulator to the inner face of the beam or the lower face of the roof slab 11.

This heat insulator consists of cement, synthetic resin emulsion, carbon fiber, organic microballoon, water, water-soluble resin or thickening agent, anti-sagging agent, antifoamer, mildewproofing agent, and inorganic microballoon.

The cement is a high-early-strength Portland cement.

The synthetic resin emulsion is for example acrylic type, vinyl acetate type, synthetic rubber type, vinylidene chloride type, polyvinyl chloride type or a mixture thereof.

The carbon fiber have a fiber length of about 6 mm for example.

The organic microballoon has a particle diameter of 10 to 100 micrometers for example and a specific gravity of 0.04 or less. Inorganic microballoon has a particle diameter of 5 to 200 micrometers for example and a specific gravity of 0.3 to 0.7.

The thickening agent is a water-soluble polymer compound such as methyl cellulose, polyvinyl alcohol, and hydroxyethyl cellulose.

The above heat insulator is produced by mixing and kneading 100 parts by weight of powder with 28 parts by Weight of synthetic resin emulsion (6.3 parts by weight in solid content equivalency), 2.6 parts by weight of carbon fiber, 24 parts by weight of organic microballoon, 0.4 part by weight of water-soluble resin, 137 parts by weight of water, and 100 parts by weight of a semi-liquid mixture consisting of a small amount of antifoamer and mildewproofing agent.

The powder consists of 100 parts by weight of a high-early-strength Portland cement and 16 parts by weight of inorganic microballoon.

This heat insulator thus produced has properties as shown in Table 1.

Specifically, it has a thermal conductivity of 0.06 (kcal/mhr°C.), a true specific gravity of 0.54, an air-dried specific gravity of 0.31, a bending strength of 12.8 (kgf/cm$^2$), a compressive strength of 14.7 (kgf/cm$^2$), a bond strength of 6.2 (kgf/cm$^2$), a moisture permeation coefficient of 0.315 (g/m$^2$hmmHg), and water absorption of 31.4(%).

The structure constructed as above is made by applying the viscous fluid heat insulator onto the surface of a structure body 13 by spraying, troweling or gap-filling according to the wet process, thereby forming the heat-insulating layer 17 to a thickness of 10 to 15 mm for example.

The structure constructed as above has the seamless heat-insulating layer 17 formed by applying the heat insulator which is prepared by mixing cement, synthetic resin emulsion, organic microballoon, carbon fiber, water, water-soluble resin, inorganic microballoon, a small amount of thickening agent, antifoamer and mildewproofing agent, onto the structure body 13 by the Wet process, so that it can effectively prevent the thermal conduction inside and outside the structure and improve fire retardance. The heat-insulating layer 17 formed on the structure body 13 has a high heat-insulating performance, good adherability to the structure body 13, a high strength and fire retardance. Therefore, the heat-insulating layer 17 itself can be used as a finished surface or used as a base on which decorative finishing is applied by directly coating, spraying, cloth hanging, tiling, etc. The heat-insulating layer 17 can be easily applied to any part having whatever shape, reduce stages of execution of works, secure a broad effective area (space) for accommodation, and extensively lower labor and costs.

Further, since the heat-insulating performance can be improved, occurrence of dew condensation can be thoroughly prevented.

The heat insulator made as above has a thermal conductivity of 0.06 (kcal/mhr°C.) which is not very larger than that (0.02 to 0.03 kcal/mhr°C.) of an organic heat insulator. Thus it can have substantially the same heat-insulating performance as the organic heat insulator. This is because the above heat insulator contains organic and inorganic microballoons, forming air pockets in the mortar. And because of the air pockets formed in the mortar, a true specific gravity is 0.54 and an air-dried specific gravity is 0.31, thus forming a very light heat insulator.

This heat insulator is an inorganic heat insulator containing a large amount of inorganic materials, so that fire retardance can be remarkably improved as compared with the organic heat insulator.

The heat insulator contains synthetic resin emulsion and carbon fiber in the mortar, providing a strong internal bonding. Therefore, the heat insulator of this invention has a compressive strength of 14.7 kgf/cm$^2$ and a bending strength of 12.8 kgf/m$^2$, while a conventional rigid urethane foam has a compressive strength of 1.4 to 2.0 kgf/cm$^2$ and polystyrene foam 2.5 to 3.0 kgf/cm$^2$. Thus the strength can be improved extensively.

And since the synthetic resin emulsion is contained, the heat insulator has a bond strength of 6.2 kgf/cm$^2$ against the concrete surface, capable of enhancing the integrity of the heat insulator with the concrete surface and capable of surely preventing the heat insulator from peeling. Therefore, the heat insulator can be subject to the wet process and easily applied to the ceiling, buildings with many outside and reentrant angles in case of including beams, and cylindrical buildings. These execution of works are difficult to compete by conventional methods including the spraying of expanded urethane, boarding, and a dry process using heat-insulating boards.

Since the heat-insulating performance, fire retardance and strength of the heat insulator can be improved, it is not required that in view of legal fire preventing regulations and strength, a flame retardant material such as a plaster board is put on a heat insulator to form a base on which facing is applied. And stages of execution of works to make a building fireproofed can be extensively reduced. And since a seamless application is allowed, labor and costs can be reduced extensively with the improvement of heat-insulating performance.

The heat insulator may be a breathable heat insulator to effect automatic adjustment of the room humidity.

Specifically, the heat insulator has a low moisture permeation coefficient of 0.315 (g/m$^2$hmmHg) and a water absorption of 31.4(%) giving suitable water absorbing performance. When the room humidity increases, the heat-insulating layer 17 absorbs moisture and collects in the layer 17 and when the room humidity lowers, the insulating layer 17 releases moisture, thereby automatically adjusting the room humidity.

The right column of the aforementioned table contains Comparative Example to show the properties of a heat insulator which is prepared by mixing and kneading 100 parts by weight of a high-early-strength Portland cement with 62 parts by weight of synthetic resin emulsion (45% in solid content density) (27.9 parts by weight of solid content equivalency), 2.6 parts by weight of carbon fiber, 10.4 parts by weight of organic microballoon, 125 parts by weight of water, 100 parts by weight of a semi-liquid mixture consisting of a small amount of thickening agent, antifoamer and mildewproofing agent.

The properties of the heat insulator include a thermal conductivity of 0.05 kcal/mhr°C.), a true specific gravity of 0.52, an air-dried specific gravity of 0.30, a bending strength of 14.1 (kgf/cm$^2$), a compressive strength of 16.5 (kgf/cm$^2$), a bond strength of 6.8 (kgf/cm$^2$), a moisture permeation coefficient of 0.127 (g/m$^2$hmmHg), and a water absorption of 20.5 (%).

When Comparative Example is compared with the present embodiment, Comparative Example not containing inorganic microballoon has a smaller thermal conductivity than the present embodiment. Since the synthetic resin emulsion content is increased, it is seen that the bending strength and compressive strength are improved and the bond strength is also improved.

As an example of a conventional heat insulator using cement as matrix, such as expanded mortar and pearlite mortar, a commercially available expanded heat-insulating mortar has a thermal conductivity of 0.09 to 0.12 (kcal/mhr°C.), a compressive strength of 3 to 5 (kgf/cm$^2$) and a bond strength to a mortar board of 1.1 (kgf/cm$^2$). When compared with the above, it is clear that the insulator of this invention is superior in strength and heat-insulating performance.

Figure 2:
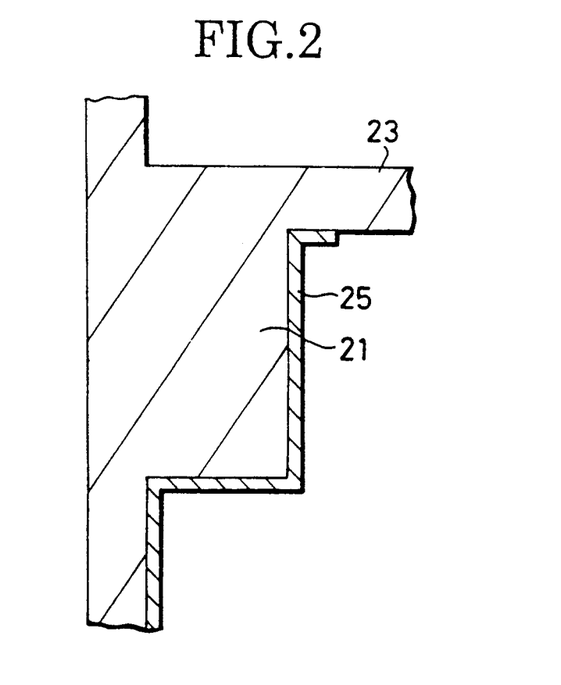
FIG. 2 is a vertical section showing another structure using the heat insulator of this invention.
Figure 3:
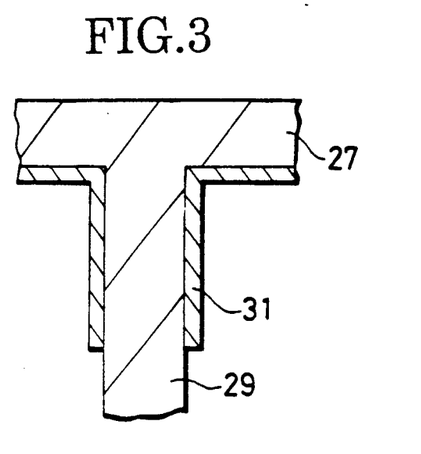
FIG. 3 to FIG. 5 are transverse cross sections showing other structures using the heat insulator of this invention.
Figure 4:
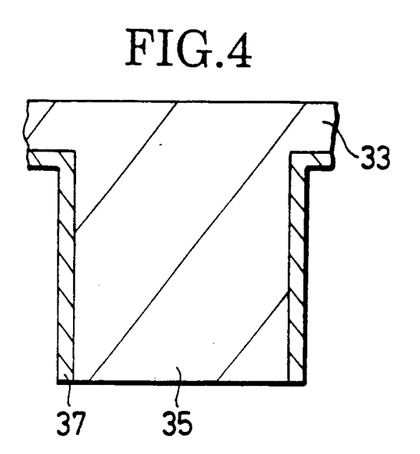
Figure 5:
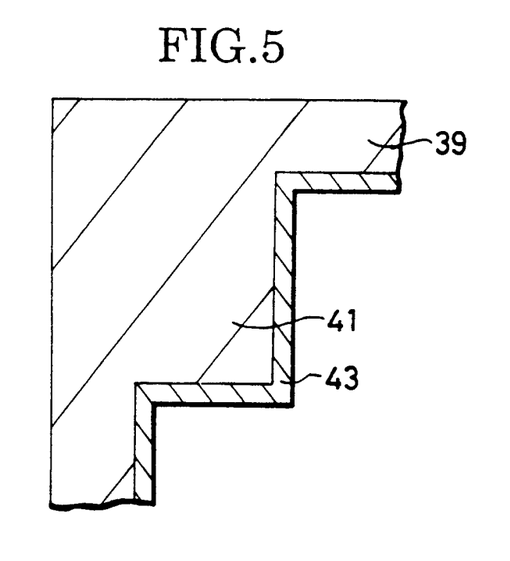

In the above embodiment, the heat insulator of this invention was applied to the structure body 13 shown in FIG. 1 by the wet process. But this invention is not limited to the above embodiment. As shown in FIG. 2, a heat-insulating layer 25 may be formed on the inner face of a beam 21 and the lower face of floor slab 23; as shown in FIG. 3, a heat-insulating layer 31 may be formed on the inner face of an outer wall 27 and the both faces of a partition wall 29; as shown in FIG. 4, a heat-insulating layer 37 may be formed on the inner face of an outer wall 33 and the both faces of a column 35; and as shown in FIG. 5, a heat-insulating layer 43 may be formed on the inner face of an outer wall 39 and a column 41.

To 100 parts by weight of cement, the materials such as synthetic resin emulsion, organic microballoon, carbon fiber, and inorganic microballoon can be added in variable amounts in the ranges of 3 to 50 parts by weight (in solid content equivalency), 1 to 20 parts by weight, 0.3 to 5 parts by weight, and 10 to 200 parts by weight respectively, to provide substantially the same effect as the above embodiment. Varying the amount of each material can modify strength, specific gravity, heat-insulating performance and fire resistant performance, capable of preparing a heat insulator provided with desired heat-insulating performance, fire resistant performance and strength.

In the above embodiment, the heat-insulating layer 17 was formed on the inner face of the structure body 13, but this invention is not limited to the above embodiment. Forming the heat-insulating layer on the outer face of the structure body also results in obtaining substantially the same effect as the above embodiment.

In the above embodiment, a small amount of thickening agent, antifoamer and mildewproofing agent was mixed into the heat insulator, but this invention is not limited to the above embodiment. Without mixing the above thickening agent, antifoamer and mildewproofing agent or with the addition of other materials if required, substantially the same effect as the above embodiment can be attained.

| Property | First embodiment | Second embodiment |
|---|---|---|
| Thermal conductivity (kcal/mhr °C.) | 0.06 | 0.05 |
| Specific gravity | | |
| True specific gravity | 0.54 | 0.52 |
| Air-dried specific gravity | 0.31 | 0.30 |

-continued

| Property | First embodiment | Second embodiment |
|---|---|---|
| Strength | | |
| Bending strength (kgf/cm$^2$) | 12.8 | 14.1 |
| Compressive strength (kgf/cm$^2$) | 14.7 | 16.5 |
| Bond strength (kgf/cm$^2$) | Mortar 6.2 | Mortar 6.8 |
| Moisture permeation coefficient (g/m$^2$hmmHg) | 0.315 | 0.127 |
| Water absorption coefficient (Volume %) | 31.4 (24th in water) | 20.5 (24th in water) |

Figure 6:
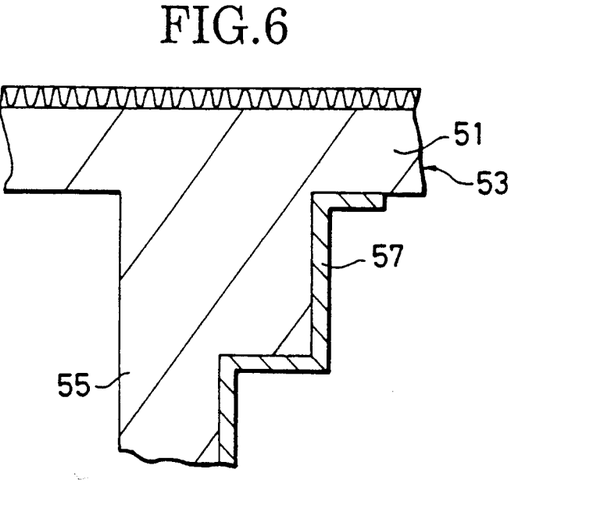
FIG. 6 is a vertical section showing one embodiment of the structure using the heat insulator of this invention.

FIG. 6 shows one embodiment of the structure of this invention, in which reference numeral 51 denotes a roof slab of structure body 53.

This roof slab 51 is supported by a beam 55 of a structure body 53.

A heat-insulating layer 57 is formed on the inner face of the beam 55 and the lower face of the roof slab 51. The heat-insulating layer 7 formed on the lower face of the roof slab 51 has a thickness of about 50 to 60 cm for example from the inner side of the beam 55. This is to prevent the formation of heat bridge or to prevent conduction of heat from outside through the roof.

The heat-insulating layer 57 is formed by adhering a viscous fluid heat insulator to the inner face of the beam 55 or the lower face of the roof slab 51.

This heat insulator consists of cement, synthetic resin emulsion, carbon fiber, organic microballoon, water, water-soluble resin or thickening agent, anti-sagging agent, antifoamer and mildewpoofing agent.

The cement used is a high-early-strength Portland cement.

The synthetic resin emulsion is for example acrylic type, vinyl acetate type, synthetic rubber type, vinylidene chloride type, polyvinyl chloride type or a mixture thereof.

The carbon fiber have a fiber length of about 6 mm for example.

The organic microballoon has a particle diameter of 10 to 100 micrometers for example and a specific gravity of 0.04 or less.

The thickening agent is a water-soluble polymer compound such as methyl cellulose, polyvinyl alcohol, and hydroxyethyl cellulose.

The above heat insulator is produced by mixing and kneading 100 parts by weight of a high-early-strength Portland cement with 2 parts by weight of synthetic resin emulsion (45% of solid content density) (27.9 parts by weight in solid content equivalency), 2.6 parts by weight of carbon fiber, 10.4 parts by weight of organic microballoon, 125 parts by weight of water, and 100 parts by weight of a semi-liquid mixture consisting of a small amount of thickening agent, antifoamer and mildewproofing agent.

This heat insulator thus produced has the properties as shown in Table 1.

Specifically, it has a thermal conductivity of 0.05 (kcal/mhr°C.), a true specific gravity of 0.52, an air-dried specific gravity of 0.30, a bending strength of 14.1

(kgf/cm$^2$), a compressive strength of 16.5 (kgf/cm$^2$), a bond strength of 6.8 (kgf/cm$^2$), a moisture permeation coefficient of 0.127 (g/m$^2$hmmHg), and a water absorption of 20.5(%).

The structure constructed as above is made by applying the viscous fluid heat insulator onto the surface of the structure body 53 by praying, troweling or gap-filling according to the wet process, thereby forming the heat-insulating layer 57 to a thickness of 10 to 15 mm for example.

The structure constructed as above has the seamless heat-insulating layer 57 formed by applying the heat insulator which is prepared by mixing cement, synthetic resin emulsion, organic microballoon, carbon fiber, water, and a small amount of thickening agent, antifoamer and mildewproofing agent, onto the structure body 53 by the wet process, so that it can effectively prevent the thermal conduction inside and outside the structure and improve fire retardance. The heat-insulating layer 57 formed on the structure body 53 has a high heat-insulating performance, good adherability to the structure body 53, a high strength and fire retardance. Therefore, the heat-insulating layer 57 itself can be used as a finished surface or used as a base on which decorative finishing is applied by directly coating, spraying, cloth hanging, tiling, etc. The heat-insulating layer 57 can be easily applied to any part having whatever shape, reduce stages of execution of works, and extensively lower labor and costs.

Further, since the heat-insulating performance can be improved, occurrence of dew condensation can be thoroughly prevented.

The heat insulator made as above has a thermal conductivity of 0.05 (kcal/mhr°C.) which is not very larger than that (0.02 to 0.03 kcal/mhr°C.) of an organic heat insulator. Thus it can have substantially the same heat-insulating performance as the organic heat insulator. This is because the above heat insulator contains organic microballoons, forming air pockets in the mortar. And because of the air pockets formed in the mortar, a true specific gravity is 0.54 and an air-dried specific gravity is 0.31, thus forming a very light heat insulator.

Since the above heat insulator uses cement in the form of matrix, fire retardance can be extensively improved as compared with that of the organic heat insulator.

The heat insulator contains synthetic resin emulsion and carbon fiber in the mortar, providing a strong internal bonding. Therefore, the heat insulator of this invention has a compressive strength of 16.5 kgf/cm$^2$ and a bending strength of 14.1 kgf/cm$^2$, while a conventional rigid urethane foam has a compressive strength of 1.4 to 2.0 kgf/cm$^2$ and polystyrene foam 2.5 to 3.0 kgf/cm$^2$. Thus the strength can be improved extensively.

And since the synthetic resin emulsion is contained, the heat insulator has a bond strength of 6.8 kgf/cm$^2$ against the concrete surface, capable of enhancing the integrity of the heat insulator with the concrete surface and capable of surely preventing the heat insulator from peeling. Therefore, the heat insulator can be subject to the wet process and easily applied to the ceiling, buildings with many outside and reentrant angles in case of including beams, and cylindrical buildings. These execution of works are difficult to complete by conventional methods including the spraying of expanded urethane, boarding, and a dry process using heat-insulating boards. Therefore, stages of execution of works to make a building fireproofed can be extensively reduced. And since a seamless application is allowed, labor and costs can be reduced extensively with the improvement of heat-insulating performance.

The heat insulator may be a breathable heat insulator to effect automatic adjustment of the room humidity.

Specifically, the heat insulator has a low moisture permeation coefficient of 0.127 (g/m$^2$hmmHg) and a water absorption of 20.5(%) giving a suitable water absorbing performance. When the room humidity increases, the heat-insulating layer 57 absorbs moisture and collects moisture therein and when the room humidity lowers, the heat-insulating layer 57 releases moisture, thereby automatically adjusting the room humidity.

The right column of the aforementioned table contains Comparative Example to show the properties of a heat insulator which is prepared by mixing and kneading 100 parts by weight of powder with 28 parts by weight of synthetic resin emulsion (6.3 parts by weight in solid content equivalency), 2.6 parts by weight of carbon fiber, 24 parts by weight of organic microballoon, 137 parts by weight of water, and 100 parts by weight of a semi-liquid mixture consisting of a small amount of thickening agent, antifoamer and mildewproofing agent. The powder consists of 100 parts by weight of a high-early-strength Portland cement and 16 parts by weight of inorganic microballoon.

The properties of the heat insulator include a thermal conductivity of 0.06 (kcal/mhr°C.), a true specific gravity of 0.54, an air-dried specific gravity of 0.31, a bending strength of 12.8 (kgf/cm$^2$), a compressive strength of 14.8 (kgf/cm$^2$), a bond strength of 6.2 (kgf/cm$^2$), a moisture permeation coefficient of 0.315 (g/m$^2$hmmHg), and a water absorption of 31.4(%).

When Comparative Example is compared with the present embodiment, Comparative Example contains inorganic microballoon and also a small amount of synthetic resin emulsion. It is seen that in this embodiment the bending strength and compressive strength are improved and the bond strength is also improved as compared with Comparative Example.

As an example of a conventional heat insulator using cement as matrix, such as expanded mortar and pearlite mortar, a commercially available expanded heat-insulating mortar has a thermal conductivity of 0.09 to 0.12 (kcal/mhr°C.), a compressive strength of 3 to 5 (kgf/cm$^2$) and a bond strength to a mortar board of 1.1 (kgf/cm$^2$). When compared with the above, it is clear that the present embodiment is superior in strength and heat-insulating performance.

Figure 7:
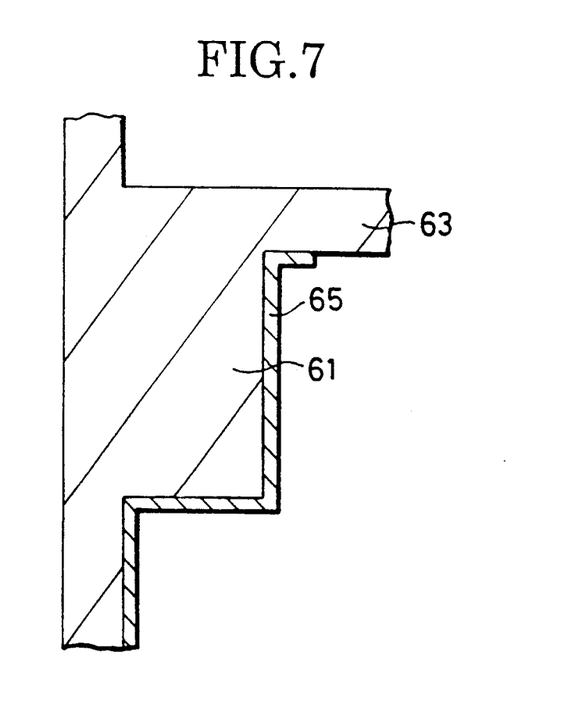
FIG. 7 is a vertical section showing another embodiment using the heat insulator of this invention for a structure.
Figure 8:
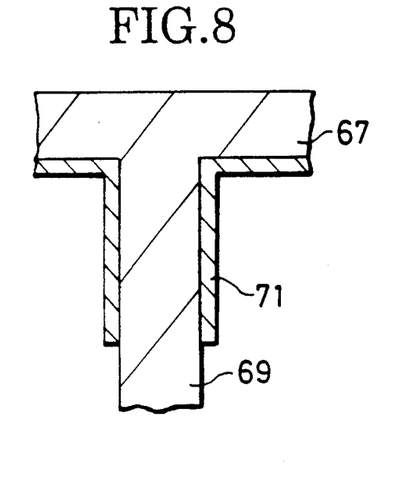
FIG. 8 to FIG. 10 are transverse cross sections showing other embodiments using the heat insulator of this invention for a structure.
Figure 9:
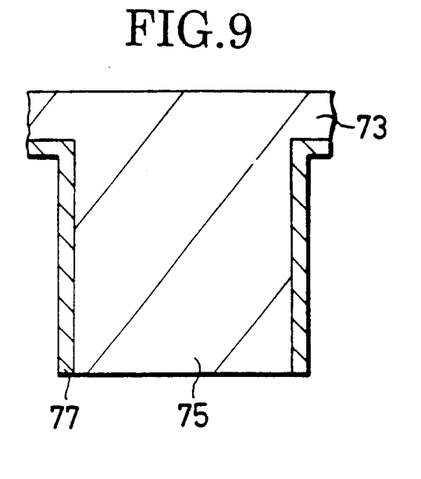
Figure 10:
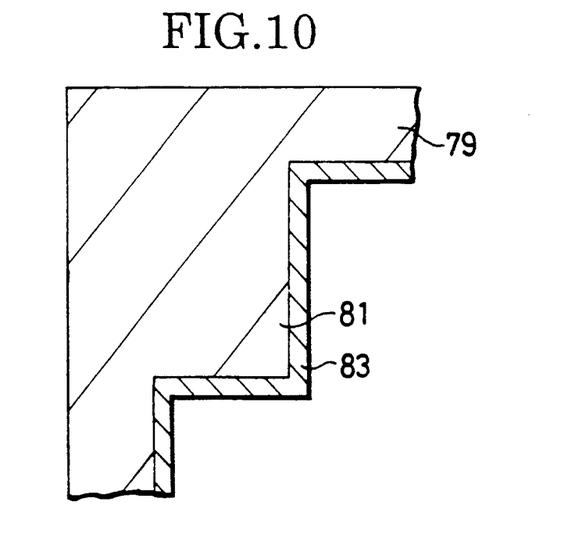

In the above embodiment, the heat insulator of this invention was applied to the structure body 53 shown in FIG. 6 by the wet process. But this invention is not limited to the above embodiment. As shown in FIG. 7, a heat-insulating layer 65 may be formed on the inner face of a beam 61 and the lower face of a floor slab 63; as shown in FIG. 8, a heat-insulating layer 71 may be formed on the inner face of an outer wall 67 and the both faces of a partition wall 69; as shown in FIG. 9, a heat-insulating layer 77 may be formed on the inner face of an outer wall 73 and the both faces of a column 75; and as shown in FIG. 10, a heat-insulating layer 83 may be formed on the inner face of an outer wall 79 and a column 81.

To 100 parts by weight of cement, the materials such as synthetic resin emulsion, organic microballoon, and carbon fiber can be added in variable amounts in the ranges of 3 to 50 parts by weight (n solid content equivalency), 1 to 20 parts by weight, and 0.3 to 5 parts by weight respectively, to provide substantially the same effect as the above embodiment. Varying the amount of each material can modify strength, specific gravity, heat-insulating performance and fire resistant performance, capable of preparing a heat insulator provided with desired heat-insulating performance, fire resistant performance and strength.

In the above embodiment, the heat-insulating layer 57 was formed on the inner face of the structure body 53, but this invention is not limited to the above embodiment. Forming the heat-insulating layer on the outer face of the structure body also results in obtaining substantially the same effect as the above embodiment.

In the above embodiment, a small amount of thickening agent, antifoamer and mildewproofing agent was mixed into the heat insulator, but this invention is not limited to the above embodiment. Without mixing the above thickening agent, antifoamer and mildewproofing agent or with the addition of other materials if required, the substantially same effect as the above embodiment can be attained.

Industrial Applicability

The first version of the new heat insulator has 3 to 50 parts by weight of synthetic resin emulsion in solid content equivalency, 1 to 20 parts by weight of organic microballoon, 0.3 to 5 parts by weight of carbon fiber, and 10 to 200 parts by weight of inorganic microballoon mixed with 100 parts by weight of cement. Therefore, it can be subjected to the wet process and have extensively improved fire retardance and heat-insulating performance.

The heat insulator has synthetic resin emulsion and carbon fiber contained in the mortar, providing a strong internal bonding. And the strength such as compressive strength and bending strength can be improved in addition to the crack preventing effect.

Since the synthetic resin emulsion is contained, the bonding strength of the heat insulator to the concrete surface can be improved, and the wet process can be used.

Because the above heat insulator contains organic and inorganic microballoons, air pockets are formed in the mortar. And the thermal conductivity can be lowered and the heat-insulating performance can be improved.

This heat insulator is an inorganic heat insulator containing a large amount of inorganic materials, so that fire retardance can be improved.

In a first embodiment of the new structure, a seamless heat-insulating layer is formed by forming a heat insulator on a structure body by a wet process in which the heat insulator prepared by mixing 3 to 50 parts by weight of synthetic resin emulsion in solid content equivalency, 1 to 20 parts by weight of organic microballoon, 0.3 to 5 parts by weight of carbon fiber and 10 to 200 parts by weight of inorganic microballoon with 100 parts by weight of cement is applied. Therefore, it can effectively prevent the thermal conduction inside and outside the structure and improve fire retardance. The heat-insulating layer formed on the structure body has a high heat-insulating performance, good adherability to the structure body, a high strength and fire retardance. Therefore, the heat-insulating layer itself can be used as a finished surface or used as a base on which decorative finishing is applied by directly coating, spraying, cloth hanging, tiling, etc. Thus, the stages of execution of works for making a building to have a fire-insulating structure can be largely reduced. In comparison with a conventional heat-insulating structure, an effective space can be made bigger, extensively lowering labor and costs.

The heat insulator of the second embodiment is prepared by mixing 3 to 50 parts by weight of synthetic resin emulsion in solid content equivalency, 1 to 20 parts by weight of organic microballoon and 0.3 to 5 parts by weight of carbon fiber to 100 parts by weight of cement, so that it can be applied by the wet process. And the fire retardance and heat-insulating performance can be extensively improved.

Specifically, the heat insulator has synthetic resin emulsion and carbon fiber contained in the mortar, providing a strong internal bonding. And the strength such as compressive strength and bending strength can be improved in addition to the crack preventing effect.

Since the synthetic resin emulsion is contained, the bonding strength of the heat insulator to the concrete surface can be improved.

Because the organic microballoon is contained, air pockets are formed in the mortar. And the thermal conductivity can be lowered and the heat-insulating performance can be improved.

Since the above eat insulator uses cement in the form of matrix, fire retardance can be extensively improved.

In a structure having the heat insulator of the second embodiment, a seamless heat-insulating layer is formed by forming a heat insulator on a structure body by a wet process in which a heat insulator prepared by mixing 3 to 50 parts by weight of synthetic resin emulsion in solid content equivalency, 1 to 20 parts by weight of organic microballoon and 0.3 to 5 parts by weight of carbon fiber with 100 parts by weight of cement is applied. Therefore, it can effectively prevent the thermal conduction inside and outside the structure and improve fire retardance. The heat-insulating layer formed on the structure body has a high heat-insulating performance, good adherability to the structure body, a high strength and fire retardance. Therefore, the heat-insulating layer itself can be used as a finished surface or used as a base on which decorative finishing is applied by directly coating, spraying, cloth hanging, tiling, etc. Thus, the stages of execution of works can be largely reduced. In comparison with a conventional heat-insulating structure, an effective space can be made bigger, extensively lowering labor and costs.

What is claimed is:

1. A strong, lightweight heat insulator comprising 3 to 50 parts by weight of synthetic resin emulsion in solid content equivalency, 1 to 20 parts by weight of organic microballoon, 0.3 to 5 parts by weight of carbon fiber and 10 to 200 parts by weight of inorganic microballoon with 100 parts by weight of cement, and having a specific gravity of approximately 0.1 to 0.3 and thermal conductivity of approximately 0.04 to 0.07 KCal/mhr°C.

2. A structure comprising a heat-insulating layer on a structure body, the heat-insulating layer being strong, lightweight and having 3 to 50 parts by weight of synthetic resin emulsion in solid content equivalency, 1 to 20 parts by weight of organic microballoon, 0.3 to 5 parts by weight of carbon fiber and 10 to 200 parts by weight of inorganic microballoon with 100 parts by weight of cement, having a specific gravity of approximately 0.1 to 0.3 and thermal conductivity of approximately 0.04 to 0.07 KCal/mhr°C., and being of suitable composition for wet application to the structure body.

3. A strong, lightweight heat insulator comprising 3 to 50 parts by weight of synthetic resin emulsion in solid content equivalency, 1 to 20 parts by weight of organic microballoon and 0.3 to 5 parts by weight of carbon fiber with 100 parts by weight of cement, and having a specific gravity of approximately 0.1 to 0.3 and thermal conductivity of approximately 0.04 to 0.07 KCal/mhr°C.

4. A structure comprising a heat-insulating layer on a structure body, the heat-insulating layer being strong, lightweight and having 3 to 50 parts by weight of synthetic resin emulsion in solid content equivalency, 1 to 20 parts by weight of organic microballoon and 0.3 to 5 parts by weight of carbon fiber with 100 parts by weight of cement, having a specific gravity of approximately 0.1 to 0.3 and thermal conductivity of approximately 0.04 to 0.07 KCal/mhr°C., and being of suitable composition for wet application to the structure body.

5. A method of making a strong, lightweight heat insulator, the method comprising mixing 3 to 50 parts by weight of synthetic resin emulsion in solid content equivalency, 1 to 20 parts by weight of organic microballoon, 0.3 to 5 parts by weight of carbon fiber and 10 to 200 parts by weight of inorganic microballoon with 100 parts by weight of cement, and having a specific gravity of approximately 0.1 to 0.3 and thermal conductivity of approximately 0.04 to 0.07 KCal/mhr°C.

6. A method of making a strong, lightweight heat insulator, the method comprising mixing 3 to 50 parts by weight of synthetic resin emulsion in solid content equivalency, 1 to 20 parts by weight of organic microballoon and 0.3 to 5 parts by weight of carbon fiber with 100 parts by weight of cement, and having a specific gravity of approximately 0.1 to 0.3 and thermal conductivity of approximately 0.04 to 0.07 KCal/mhr°C.

* * * * *